A. B. ALLEN.
SWITCH OPERATING MECHANISM.
APPLICATION FILED JAN. 20, 1908.
903,156.
Patented Nov. 10, 1908.
2 SHEETS—SHEET 1.
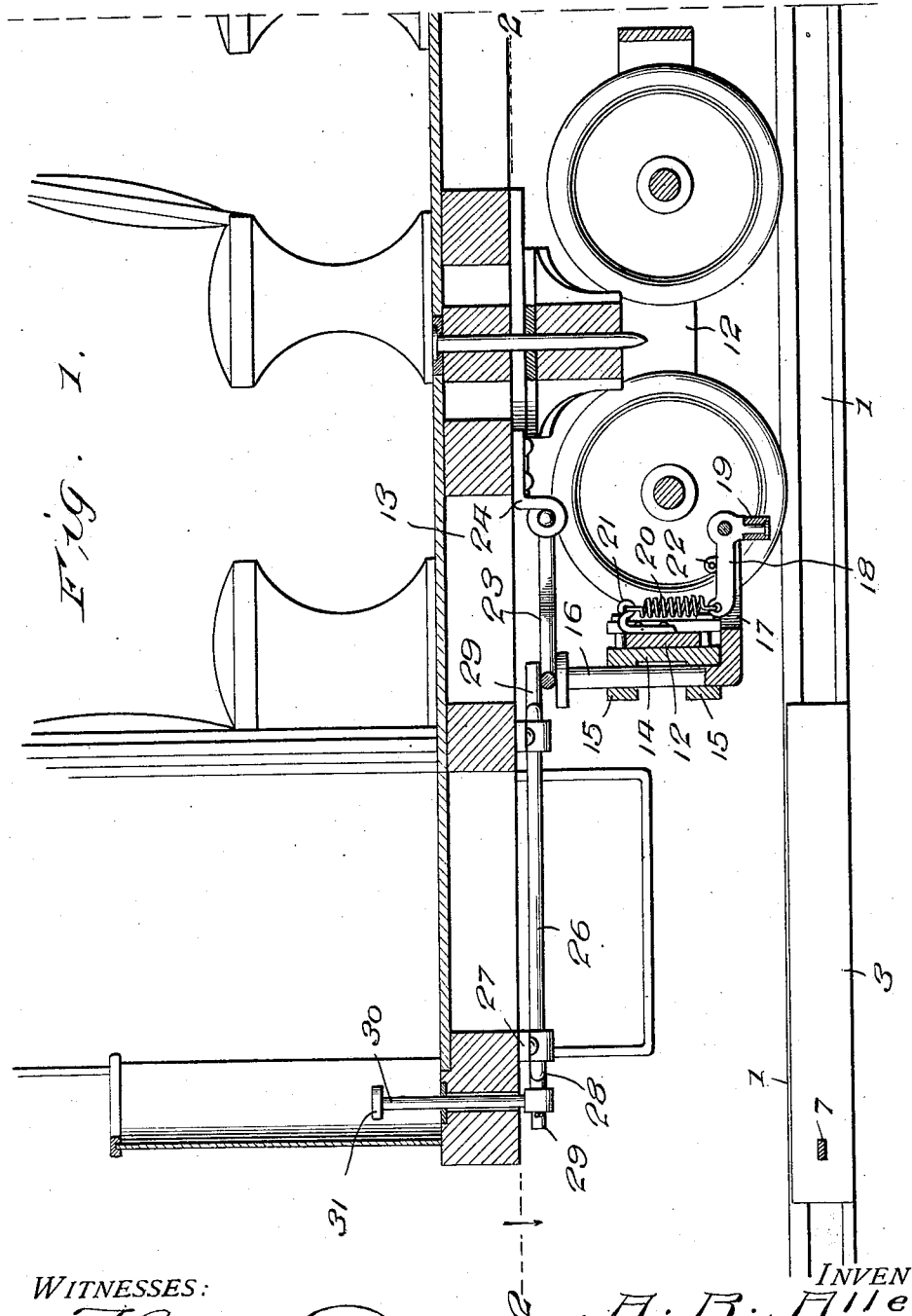
WITNESSES:
INVENTOR
A. B. Allen
BY
W. J. FitzGerald & Co.
Attorneys

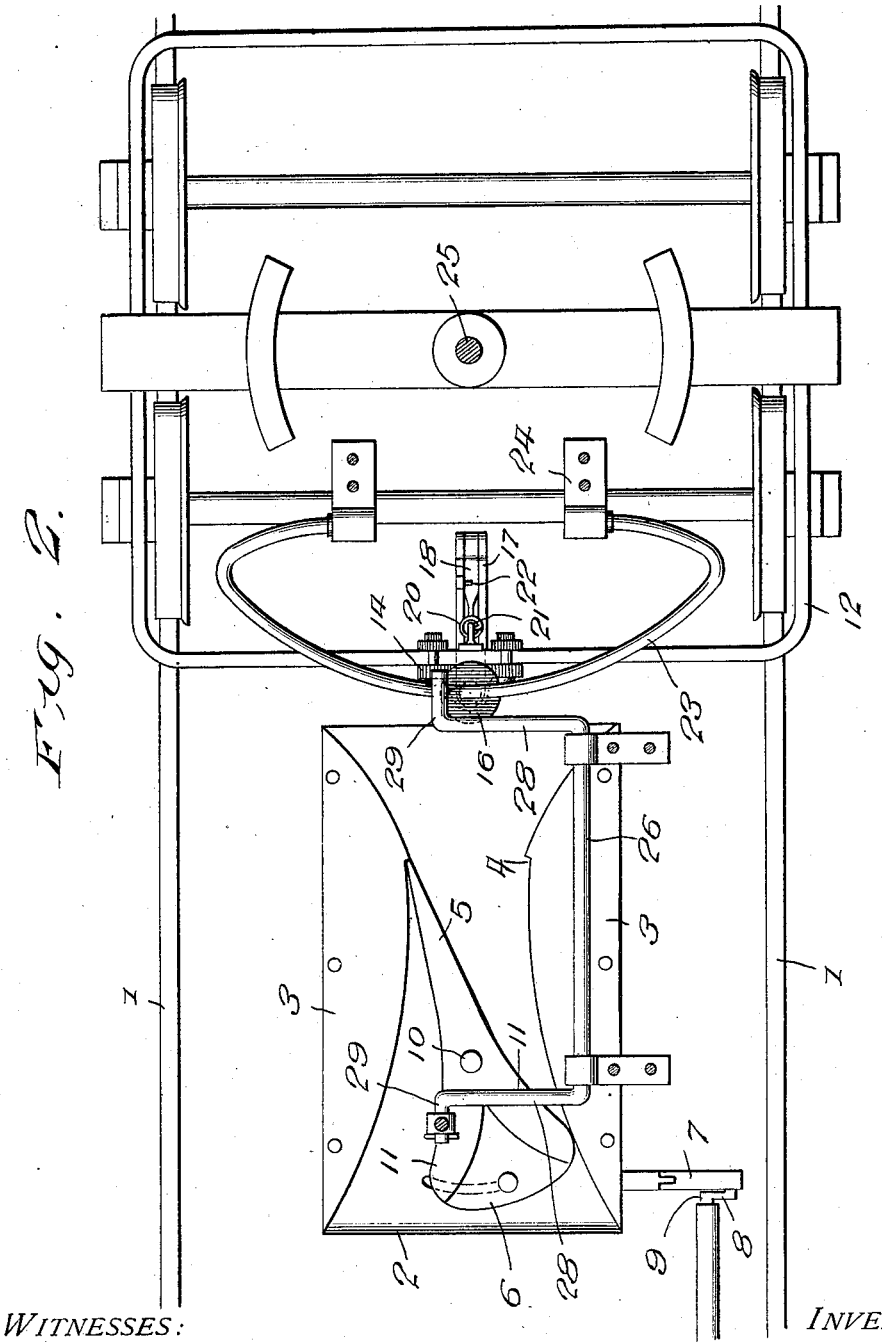

UNITED STATES PATENT OFFICE.

AARON B. ALLEN, OF PUEBLO, COLORADO.

SWITCH-OPERATING MECHANISM.

No. 903,156.   Specification of Letters Patent.   Patented Nov. 10, 1908.

Application filed January 20, 1908. Serial No. 411,703.

*To all whom it may concern:*

Be it known that I, AARON B. ALLEN, a citizen of the United States, residing at Pueblo, in the county of Pueblo and State of Colorado, have invented certain new and useful Improvements in Switch-Operating Mechanism; and I do hereby declare the following to be a full, clear, and exact description of the invention, such as will enable others skilled in the art to which it appertains to make and use the same.

My invention relates to new and useful improvements in switch-operating mechanism and more particularly to that class adapted to be employed in connection with street cars and my object is to provide manually-operated means for opening or closing a switch from a car body.

A further object is to provide means for yieldingly mounting parts of the operating mechanism, whereby when a solid obstruction is encountered, said parts will pass over the same and a still further object is to provide means for controlling the switch-operating mechanism when on curves, as well as on a straight track.

Other objects and advantages will be hereinafter referred to and more particularly pointed out in the claims.

In the accompanying drawings which are made a part of this application, Figure 1 is a sectional view through a car body and switch-operating mechanism attached thereto, and, Fig. 2 is a sectional view as seen on line 2—2, Fig. 1.

Referring to the drawings in which similar reference numerals designate corresponding parts throughout the several views, 1 indicates the usual or any preferred form of track rails, between which is located a switch-controlling mechanism, consisting of a plate 2 having flanges 3 along each edge thereof, the inner faces of said flanges being curved and having off-set portions 4 adjacent one end, in which is adapted to be seated one end of a switch-operating lever 5, the opposite end of said lever having a head 6 thereon, to which is secured a pitman 7, the outer end of said pitman being secured to the cranked end 8 of a switch point-operating shaft 9 and by pivoting the lever 5 to the plate 2 by extending a pivot pin 10 through the lever 5 and into the plate 2, it will be readily seen that when the lever is swung laterally on the pivot pin, the pitman 7 will rock the shaft 9 and open or close the switch point, and as said switch point forms no part of my present invention, the same is not shown.

That end of the lever 5 registering with the off-set portions 4, is substantially wedge-shaped, while the head 6 on the opposite side of the pivot pin 10 is provided with outwardly curved faces 11, said faces being curved outwardly a sufficient distance to engage the inner curved faces of the flanges 2, when the end of the lever 5 is resting in the off-set portion 4, thus completely closing the passageway between the two flanges.

Secured to the truck-frame 12 of a car body 13, is a bracket 14, which bracket is provided at its upper and lower edges with ears 15, through which extends a plunger 16, the lower end of the plunger being extended rearwardly and bifurcated to form arms 17, between which is pivotally secured a bell-crank lever 18, the depending section of said bell-crank lever being provided with a friction roller 19, while the horizontal section thereof has secured thereto the lower end of a spring 20, while the upper end of said spring is secured to a hook 21 carried by the frame 12, the friction roller 19 being so located that when the plunger 16 is lowered, said roller will engage the curved faces 11 of the head 6 and swing the lever 5 laterally to operate the shaft 9, while the spring 20 is employed for holding the friction roller in position to engage the head of the lever 5 when the plunger is lowered, and hold the friction roller out of engagement with the lever, when the switch is not to be operated, the upward swinging movement of the bell-crank lever 18 being limited by a stop-pin 22 carried by one of the arms 17.

In order to operate the plunger 16 at whatever angle the truck may be to the longitudinal axial plane of the car body 13, I provide a bail 23, said bail being pivotally secured to the car body or frame of trucks 13 by means of straps 24, the forward section of said bail being curved in such manner as to always rest over the end of the plunger 16 at whatever angle the truck may be to the axial plane of the car body, so that when downward pressure is directed on the bail, the plunger 16 will be lowered and the friction roller 19 disposed in the path of the lever 5, thereby insuring that the switch will be operated whether the car is rounding a curve or on a straight section of the track-way, the curvature of the forward section of the bail being such that all parts of the curved section will be at the same radius from the axis of the pivot bolt 25 of the truck frame 12 and as the plunger also swings in a common radius from the bolt 25, the bail will always rest thereon.

As the vestibule of the car body is at a distance forward of the truck frame, I provide a rocking shaft 26 for directing pressure on the bail to lower the plunger 16, said rocking shaft being pivotally secured to the bottom of the car body in any preferred manner, as by means of straps 27, each end of the rocking shaft being provided with an angular arm 28, which arms are extended at right angles to the longitudinal axis of the rocking shaft and are provided at their free ends with shanks 29, one of said shanks extending over and adapted to engage the bail 23 while the opposite shank has pivotally mounted thereon a plunger 30, which plunger extends upwardly through the floor of the car body and in position to be operated from the vestibule of the car by directing weight on the head 31, at the upper end of said plunger, the lowering of said plunger rocking the shaft 26 and lowering the friction roller 19 into the path of the switch-operating lever 5, in which position said friction roller will be held as long as the weight remains on the plunger 30.

When the pressure is released from the plunger 30, the spring 20 will raise the plunger 16 until the friction roller 19 is out of the path of the switch-operating lever, the tension of the spring being such as to hold the friction roller in the path of the switch-operating lever and swing the same on its pivot pin, but should the friction roller engage a solid object, the spring will yield sufficiently to allow the bell crank lever to swing on its pivot pin and clear the friction roller of the object which it has encountered. It will thus be seen that I have provided a very efficient and positive means for operating the switch-controlling lever at whatever angle the car body may be to the truck, and it will further be seen that by attaching one end of the spring to the bell-crank lever carrying the friction roller and the opposite end thereof to the truck frame, said friction roller will be normally held out of engagement with the switch-controlling lever, so that the car may readily pass thereover without operating the switch and that when the bifurcated end of the plunger carrying the bell-crank lever, is swung laterally in either direction, the spring will immediately return the bifurcated end of the plunger to its initial position as soon as the friction roller has been released from the object causing the lateral movement.

What I claim is:

1. In a switch-operating mechanism, the combination with a car body and a truck frame pivotally mounted below said body; of a plunger vertically movable on said frame, a bell-crank lever pivotally secured to said plunger, a friction roller carried by one section of said bell-crank lever, a spring having one of its ends secured to the opposite section of the bell-crank lever and at its opposite end to the frame, means to limit the upward swinging movement of the bell-crank lever and means carried by the car body adapted to depress said plunger and direct the friction roller into the path of a switch-controlling lever.

2. A switch-operating mechanism comprising the combination with a car body and a truck frame swively mounted below said body; of a plunger rotatably and longitudinally movably mounted on said frame, a bell-crank lever pivotally secured to said plunger, means on said bell-crank lever adapted to engage and operate a switch-controlling lever, a spring secured at one end to said lever and at its opposite end to said frame adapted to hold said plunger in its elevated position and permit said bell crank lever to rock when a solid object is encountered, a bail pivotally secured to the car body and having a curved portion adapted to rest on said plunger and means extending from said bail to the forward end of the car adapted to lower the plunger when downward pressure is directed thereon.

3. In a switch-operating mechanism, the combination with a car body and a truck frame pivotally mounted below the car body; of a bracket secured to the frame, a plunger pivotally and longitudinally movably mounted in said bracket, yielding means to normally hold said plunger in its elevated position, additional means carried by the plunger adapted to engage a switch-controlling lever when the plunger is lowered, a bail pivotally secured to the car body and having a curved section adapted to rest on and travel over the upper end of said plunger and means adapted to depress said bail and lower the plunger when pressure is directed thereon.

4. In a switch-operating mechanism, the combination with a car body and a truck frame pivotally mounted thereunder; of a plunger vertically movably and rotatably mounted on said frame, means to normally hold the plunger in its elevated position, additional means carried by the plunger to engage and operate a switch-controlling lever, a bail pivotally mounted to the car body, said bail having a curved portion at a uniform radius from end to end from the pivotal point of the truck frame and means to direct pressure on said bail, whereby the plunger will be lowered.

5. In a switch-operating mechanism, the combination with a car body, a truck frame pivotally secured thereto, a plunger carried by said frame, means to yieldingly hold said plunger in its elevated position and means carried by the plunger adapted to engage and operate a switch-controlling lever when the plunger is depressed; of a bail pivotally secured to the car body and adapted to rest over the upper end of said plunger, a rocking shaft pivotally secured to the car body and having one of its ends engaging said bail and means secured to the opposite end of said rocking shaft whereby when pressure is directed thereon, the bail and plunger below the same will be lowered.

6. In a switch-operating mechanism, the combination with a car body and a truck frame pivotally mounted thereunder; of a plunger having means thereon adapted to operate a switch-controlling lever when depressed and means adapted to extend over and rest on the upper end of said plunger and depress said plunger when downward pressure is directed thereon.

7. In a switch-operating mechanism, the combination with a car body and a plunger suspended thereunder and having means to engage and operate a switch - controlling lever; of a pivotally mounted bail adapted to rest on said plunger and means carried by the car body adapted to operate said bail to depress the plunger.

In testimony whereof I have signed my name to this specification in the presence of two subscribing witnesses.

AARON B. ALLEN.

Witnesses:
HOMER H. PETERS,
R. I. SEDGLEY.